United States Patent

[11] 3,585,596

[72] Inventor Murray Rosenblatt
Cherry Hill, N.J.
[21] Appl. No. 778,578
[22] Filed Nov. 25, 1968
[45] Patented June 15, 1971
[73] Assignee RCA Corporation

[54] DIGITAL SIGNALLING SYSTEM
4 Claims, 6 Drawing Figs.

[52] U.S. Cl. .......................................................... 340/168, 340/359
[51] Int. Cl. .......................................................... G08c 19/26; G08c 19/18
[50] Field of Search ............................................ 340/164, 168, 171, 167, 167 B, 345, 359, 309.1; 325/163

[56] References Cited
UNITED STATES PATENTS
2,309,743 2/1943 Baughman.................... 340/171

*Primary Examiner*—Donald J. Yusko
*Assistant Examiner*—Glen R. Swann, III
*Attorney*—Edward J. Norton

ABSTRACT: A digital transmission system which is preferably bit synchronized, but is not character synchronized, is achieved by deriving a pulse train having a unique average number of pulses occurring during a certain length time interval, which number corresponds to that particular one of a set of different characters then being transmitted. The total number of pulses received and counted at a receiving station during a time interval equal in length to at least one of the certain length time intervals manifests the character then being received.

INVENTOR
MURRAY ROSENBLATT

BY Edward J. Norton
ATTORNEY

INVENTOR
MURRAY ROSENBLATT

BY Edward J. Norton
ATTORNEY

INVENTOR
MURRAY ROSENBLATT

BY Edward J. Norton
ATTORNEY

INVENTOR
MURRAY ROSENBLATT

BY Edward J. Norton
ATTORNEY

DIGITAL SIGNALLING SYSTEM

BACKGROUND OF THE INVENTION

The present invention relates to a data transmission system for the transmission of digital character-manifesting pulse train signals which are preferably bit synchronous but in which character synchronization is not required to extract character information being transmitted.

There are a number of data transmission systems available for the transmission of character information, such as the Baudot-type telegraph codes, conventional telephone dialing, tone signalling, and so forth.

However, these all have the disadvantages of being limited with respect to transmitting asynchronous digital information at high speeds without filtering networks. Further, they cannot be passed through multiplexing equipment or similar equipment without special buffering, since they are not bit synchronous.

For example, in a Baudot-type communication system, the sending and receiving stations must be character synchronized.

In tone signalling, precise analog means are required for the transmission of data. In particular, it requires a high degree of filtering. Conversion networks are required at the transmitter for converting digital information to analog form for transmission and thereafter at the receiver converting this information back to digital form. Also, tone signalling requires filtering.

It is therefore an object of this invention to provide, in as simple and economical manner as possible, a digital, character asynchronous, high-speed data transmission system for transmitting a plurality of character-manifesting digital pulse trains each corresponding to a different character to be transmitted.

SUMMARY OF THE INVENTION

In accordance with the present invention, a pulse train generator is located at a transmitting station for selectively generating any one of a plurality of character-manifesting pulse train signals. Each pulse train signal is characterized by having a different average number of discrete pulses occurring during a certain-length time interval. The pulse train generator is coupled to a character selection control means for controlling the formation and selection of that one of the plurality of pulse train signals which is generated for the certain-length time interval in accordance with the particular one of a plurality of characters which is then to be transmitted. The character-manifesting pulse train signals are than transmitted to a receiving station at which is located counting means for producing an output signal manifesting the number of pulses received during a receiving time interval at least equal in length to one of the aforesaid certain-length time intervals. Thus, the transmitted character is uniquely defined by the output signal of the pulse counter.

Additional objects and advantages of the present invention will become apparent upon consideration of the following description when taken in conjunction with the accompanying drawings wherein:

DETAILED DESCRIPTION

Figure 1:
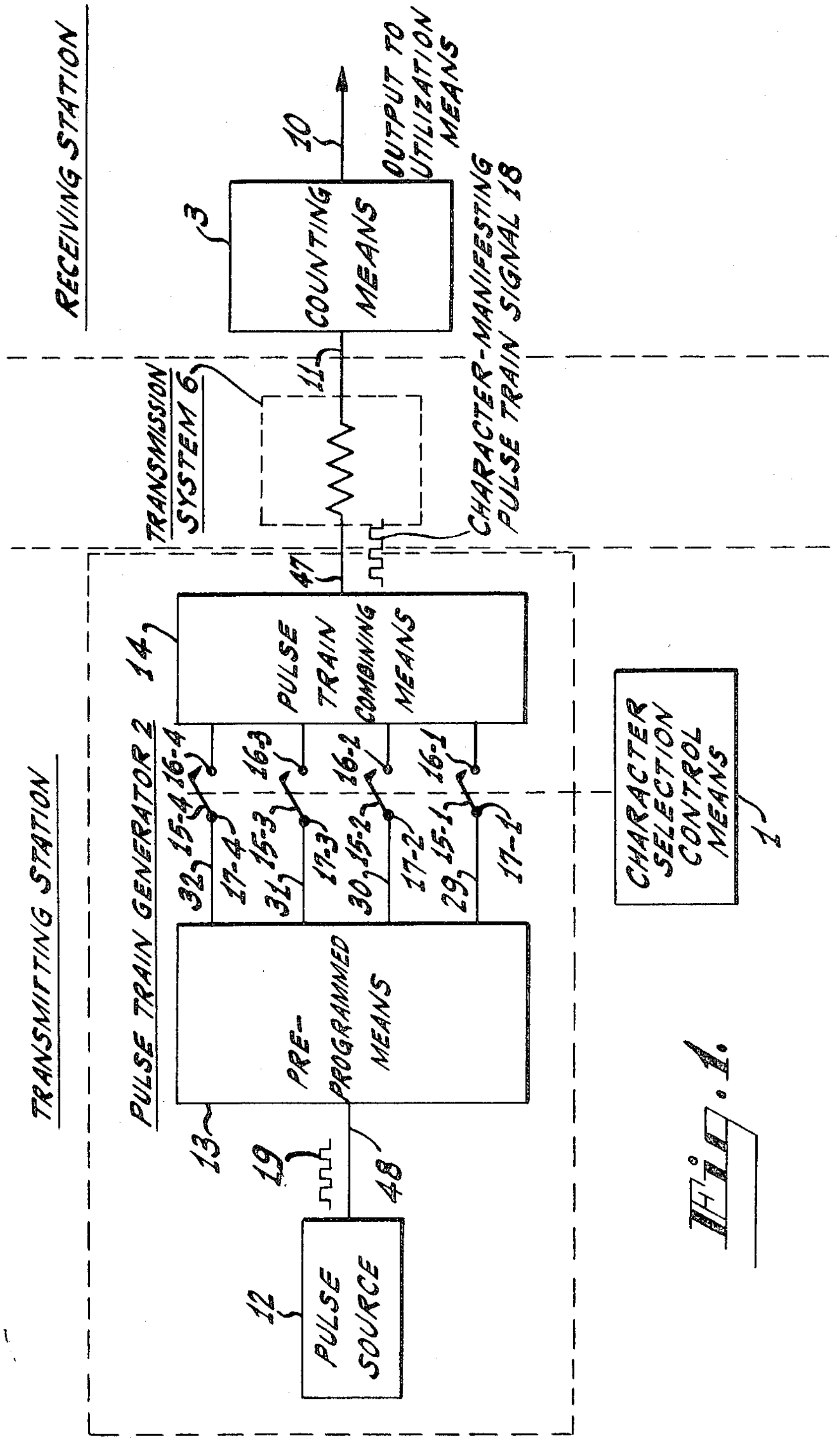
FIG. 1 shows a block diagram of the present invention.

Referring to FIG. 1, there is shown a block diagram of a character selection control means 1 and a pulse train generator 2 located at a transmitting station which is coupled to a receiving station by transmission system 6. Counting means 3 is located at the receiving station. In particular, the pulse generator 2 comprises a pulse source 12, which has its output 48 connected to the input of preprogrammed means 13. Preprogrammed means 13 has a plurality of outputs 29, 30, 31 and 32, each of which is coupled to the first terminal 17–1 to 17–4 of a different one of a plurality of separate switching means 15–1 to 15–4 each having an open and a closed switch condition. The second terminal 16–1 to 16–4 of the switching means is coupled to the inputs of pulse combining means 14, whose output 47 is a plurality of character-manifesting pulse train signals 18, each pulse train signal being characterized by having a different average number of discrete pulses occurring during the certain length time interval 45 of FIG. 6.

Figures 2, 3:
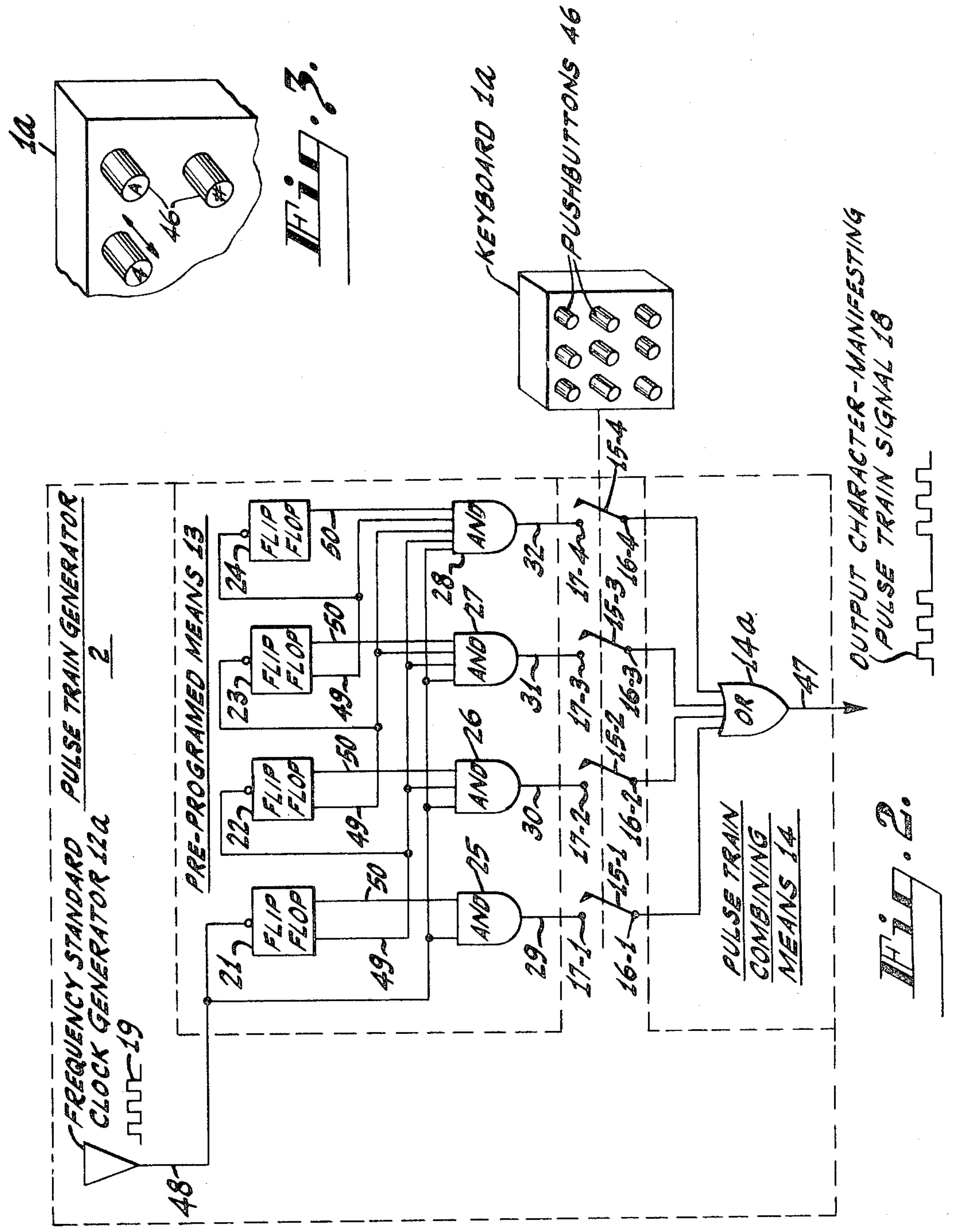
FIG. 2 is a schematic of an illustrative embodiment of the pulse generator shown in block diagram in FIG. 1.
FIG. 3 is an enlarged view of the keyboard shown in FIG. 2.

The character selection control means 1 can be a manual keyboard, as shown by way of example only in the embodiment of FIG. 2. FIG. 3 is an enlarged fractional portion of the keyboard of FIG. 2 which is shown to reveal the character selection control keys 46 as being a common type pushbutton character selector, wherein the character to be selected may be printed on the face thereof. Each of the pushbuttons 46 of the character selection control means, hereinafter called keyboard, individually establishes which switch or switches of switching means 15–1 to 15–4 are in their closed switch condition during the entire length of time interval 45.

Figure 6:
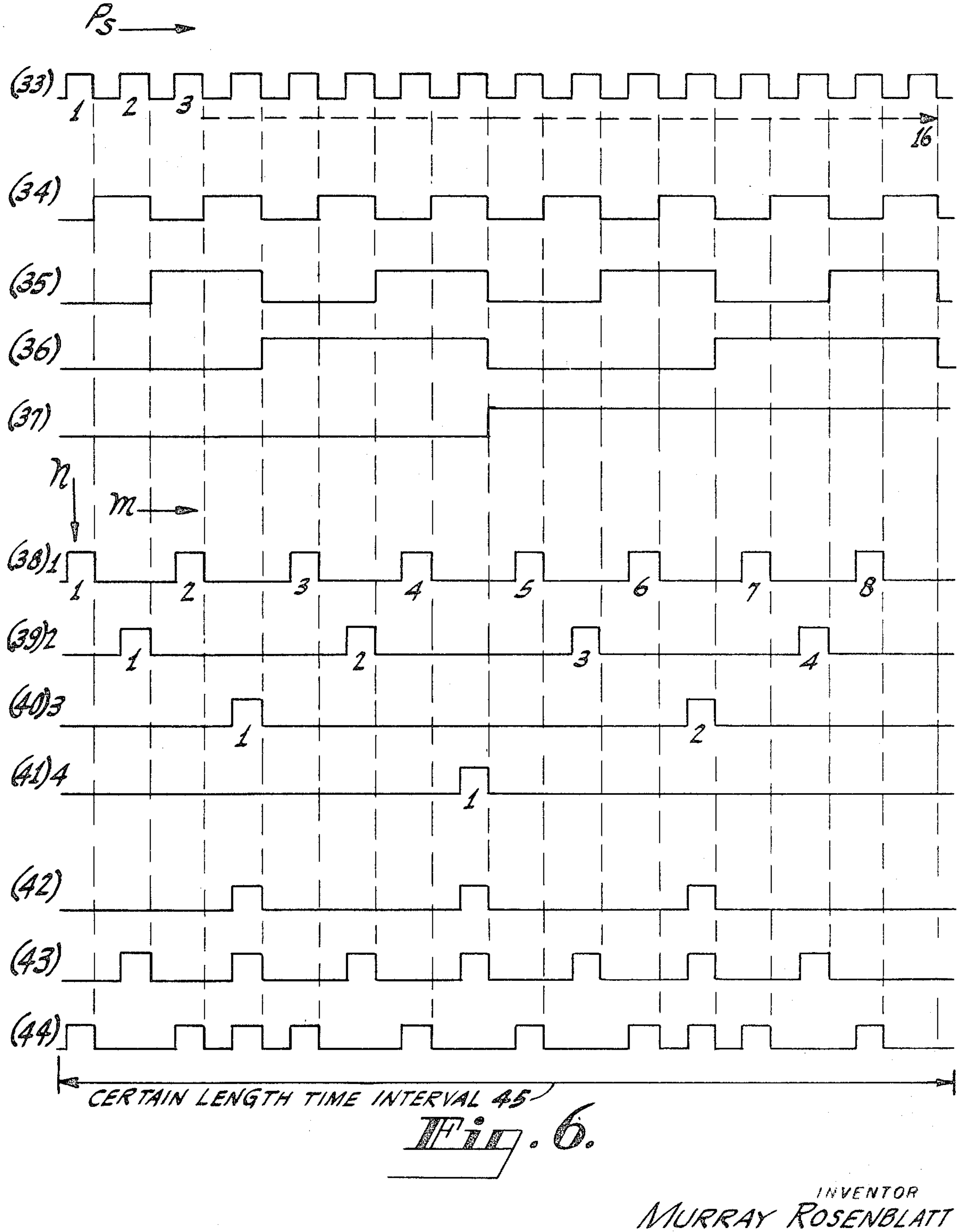
FIG. 6 shows certain input and output waveforms.

The program of the preprogrammed means is described as follows:

In FIG. 6, there is revealed the wave shape 33 of the serial source of pulses 12 of FIG. 1 which is applied to the input of preprogrammed means 13 which has a plurality of outputs 29 to 32, each output having distributed thereto a share of the serial stream of pulses from pulse source 12 occurring during the certain length time interval 45 in accordance with the particular program of the preprogrammed means. These distributed shares of pulses from the pulse source are respectively shown by pulse trains 38, 39, 40 and 41, of FIG. 6, each pulse train being distributed to a particular one of the plurality of outputs 29 to 32 of the preprogrammed means which are arranged in a predetermined order.

In the embodiment illustrated, the program of the preprogrammed means is such that these pulses are distributed to each of outputs 29 to 32 according to the following formula:

$$p_s = {}^{n11} + (m-1)2^n$$

where $P_s$= the ordinal position of a pulse in the serial stream of pulses from pulse source 12 in the certain length time interval;

$n$= the ordinal position of the particular output of the preprogrammed means; and $m$= the ordinal position of occurrence of a pulse in the pulse train on any one of the outputs of the preprogrammed means with respect to the commencement of the certain length time interval.

Following is a table of the respective values of the ordinal positions in the above-noted formula for the embodiment shown in FIGS. 1 and 2, where, for illustrative purposes only, the total number of pulses from the source during said certain time interval is 16. In practice, $P_s$ will have a maximum value which can be much larger than 16.

TABLE I

| | | | | | | | | | | | | | | | | |
|---|---|---|---|---|---|---|---|---|---|---|---|---|---|---|---|---|
| $P_s$ | 1 | 2 | 3 | 4 | 5 | 6 | 7 | 8 | 9 | 10 | 11 | 12 | 13 | 14 | 15 | 16 |
| $n$ | 1 | 2 | 1 | 3 | 1 | 2 | 1 | 4 | 1 | 2 | 1 | 3 | 1 | 2 | 1 | — |
| $m$ | 1 | 1 | 2 | 1 | 3 | 2 | 4 | 1 | 5 | 3 | 6 | 2 | 7 | 4 | 8 | — |

It will be noted that pulse 16 is not utilized in this particular embodiment. Also note, since there are four outputs, 29—32 from the preprogrammed means, $n$ may have any value from 1 to 4, inclusive. For output 29, $n$ has the value 1; for output 30, $n$ has the value 2; for output 31, $n$ has the value 3; and for output 32, $n$ has the value 4. As illustrated in FIG. 6, the particular pulses of pulse train 33 from the pulse source which are distributed to output 29 in accordance with the above program are shown in pulse train 38. Similarly, pulse trains 39, 40, and 41 show the distribution to each of outputs 30, 31 and 32 respectively.

One form that pulse source 12 and the preprogrammed means 13 may take is shown in FIG. 2. Referring to FIG. 2, pulse source 12 may consist of clock 12$a$ for producing a continuous train of serial pulses 19 at a fixed repetition rate. Preprogrammed means 13 may comprise four serially connected bistable multivibrators 21 to 24, hereinafter called flip-flops, and four AND gates 25 to 28, each of which corresponds to a separate one of flip-flops 21—24, respectively. In particular, each of flip-flops 21—23 is provided with a binary 'one' output 49 and a binary 'zero' output 50. Flip-flop 24 is provided with a binary 'zero' output 50. Flip-flop 21 has its input connected to output 48 of clock 12$a$. Flip-flop 22 has its input connected to output 49 of flip-flop 21. Similarly, flip-flops 23 and 24 have their respective inputs connected to the respective outputs 49 of flip-flops 22 and 23.

Each of the four AND gates 25—28, which correspond to flip flops 21, 22, 23 and 24, respectively, has one of its respective inputs connected to output 50 of its corresponding flip flop. The second inputs of all of the AND gates are connected in parallel to output 48 of clock 12$a$, as shown. In addition, output 49 of flip flop 21 is connected to an input of AND gates 26, 277, and 28; output 49 of flip flop 22 is connected to an input of AND gates 27 and 28; and output 49 of flip flop 23 is connected to an input of AND gate 28. In FIG. 2, the respective outputs 29 to 32 of preprogrammed means 13, at which appears the distributed pulse trains 38—41 of FIG. 6, are the respective outputs of AND gates 25—28. Each of flip flops 21 to 24 divides in half the pulse repetition rate of the input applied thereto; as shown by pulse trains 34 to 37 of FIG. 6.

As shown in both FIGS. 1 and 2, separate switching means 15–1 to 15–4 are provided, each of which has its respective first terminal 17–1 to 17–4 connected individually to a separate one of the outputs 29—32. The second terminals 16–1 to 16–4 of the separate switching means are each connected to an input of pulse combining means 14, having a single output 47. In the embodiment of FIG. 2, pulse combining means 14 is an OR gate 14$a$. Coupled to the switching means is character selection control means 1 which is utilized for selectively controlling that one or combination of switching means 15–1 to 15–4 which is in its closed switch condition. As shown in FIG. 2, the character selection control means may take the form of a manual keyboard having a plurality of character selection pushbuttons 46. FIG. 3 is an enlarged portion of keyboard 1$a$, as previously described. The pushbuttons are coupled to the switching means such that each pushbutton selectively closes a different one or unique combination of the aforesaid switching means for the entire length of time interval 45. Thus, there is produced at the output 47 of combining means 14 a pulse train signal that is uniquely associated to the character to be then transmitted as defined by the presently depressed pushbutton and which signal is characterized by having a unique average number of discrete pulses occurring during the certain length time interval 45. For example, the pushbutton 4, when pushed, could close switching means to output 30, passing pulse train 39 of FIG. 6 to the pulse combining means 14. Pushbutton $A$, when pushed, could close switching means to outputs 29 and 31, passing pulse trains 38 and 40, respectively, to pulse combining means 14, at whose output 47 there would appear the combined pulse train 44. Pushbutton 0, when pushed, could close switching means to outputs 30, 31, 32, passing pulse trains 39, 40, and 41 to pulse combining means 14 at whose output 47 there would appear the combined pulse train 43. For the preprogrammed means embodiment shown, there are a possible 15 combinations of pulse trains that can appear at output 47 of the pulse combining means, pulse trains 38 to 44 being some of these possible 15 character-manifesting pulse trains. It should be noted that although the embodiment of FIG. 2 shows four sets of flip flops and corresponding AND gates having four outputs 29 to 32 for generating character-manifesting pulse trains, a fewer or a greater number of flip flops and corresponding AND gates could, of course, be provided.

As shown in FIG. 1, output 47 is connected to a transmission system 6 for transmitting output signal 18, which is any one of the selectively generated plurality of character-manifesting pulse trains, to a receiving station at which is located counting means 3.

Counting means 3 counts the number of pulses occurring in a certain length time interval substantially equal in length to certain length time interval 45, but not necessarily synchronized with that time interval. This total number of pulses counted by counting means 3 during the counting interval manifests the particular character then being received.

Figure 4:
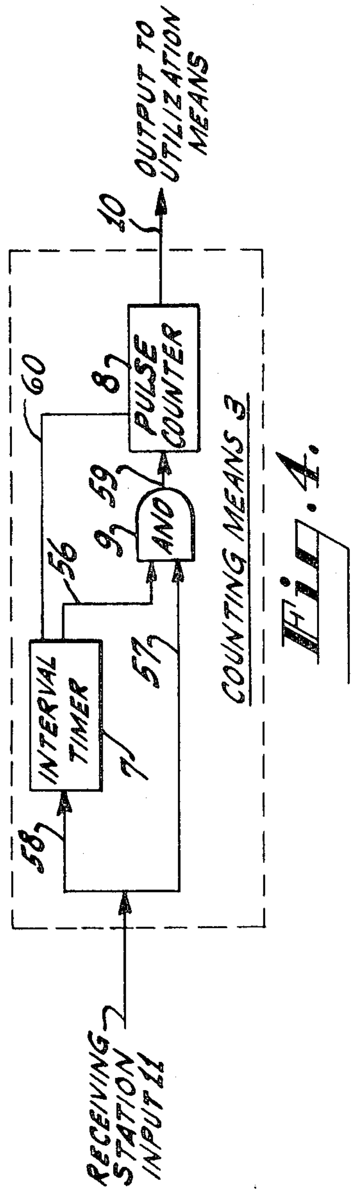
FIG. 4 is a block diagram of a counter to produce an output signal upon the receipt of the transmitted input character-manifesting pulse train.

One particular embodiment of such a counting means is shown in FIG. 4, which comprises an interval timer 7, an AND gate 9, and a pulse counter 8. The character-manifesting pulse train arriving at input 11 of the receiving station is applied both as an input to interval timer 7 over conductor 58 and as a first input to AND gate 9, over conductor 57. The output from interval timer 7 is applied as a second input to AND gate 9 over conductor 56. The output of AND gate 9 is applied as an input to pulse counter 8 over conductor 59. The output from pulse counter 8 appearing on conductor 10 is applied to utilization means now shown.

The counter shown in FIG. 4 operates by timing a time interval substantially equal in length to the certain length time interval 45 by means of interval timer 7 upon receipt of the first pulse of the transmitted pulse train signal 18. Once the interval timer 7 commences timing the time interval, the pulse counter is enabled to count the pulses occurring in that same time interval. When the time interval timing is completed by interval timer 7, the pulse counter is the counting means no longer receives the input pulse train signal. The count registered by pulse counter 8 at the end of the time interval which appears at output 10 then manifests the number of pulses received in that certain length time interval as determined by the interval timer 7.

Figure 5:
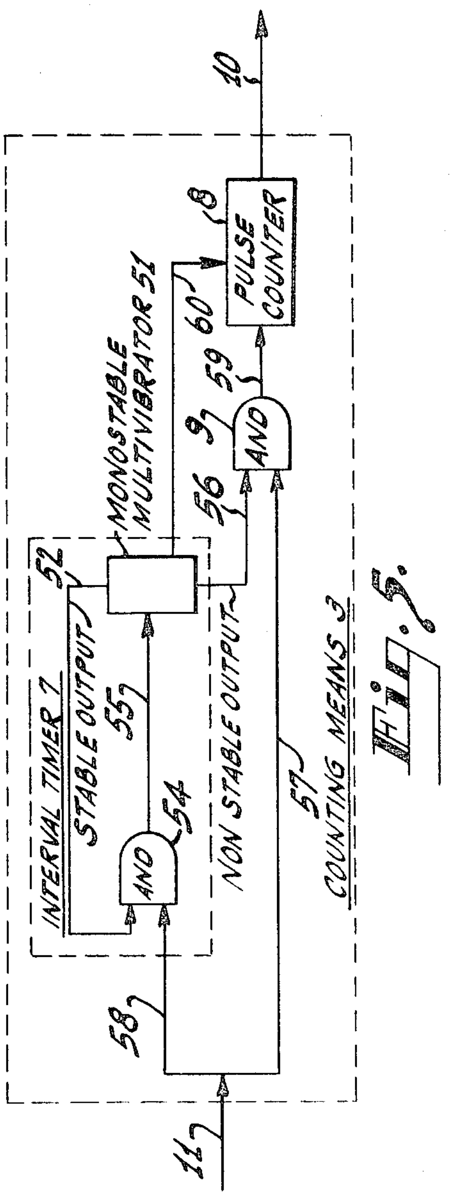
FIG. 5 is a schematic of the interval timer of FIG. 4.

More particularly, interval timer 7 may comprise monostable multivibrator 51 and AND gate 54. As shown, stable output 52 from monostable multivibrator 51 is applied as a first input to AND gate 54. The received pulse train on conductor 58 is applied as a second input to AND gate 54. The output signal appearing at the output of AND gate 54 is applied as the trigger input to monostable multivibrator 51 over conductor 55. The nonstable output 53 from monostable multivibrator 51 carries the output of interval timer 7 which is applied as an input to AND gate 9 over conductor 56 as shown in FIGS. 4 and 5.

Prior to the receipt of the first pulse of the received pulse train, the monostable multivibrator 51 is in its stable state. Under these conditions AND gate 54 passes the initial pulse of a received character-manifesting pulse train. The leading edge of this initial pulse which is passed triggers monostable multivibrator 51 from its stable output condition to its nonstable output condition. The switching of monostable multivibrator 51 occurs with sufficient rapidity to enable AND gate 9 over conductor 56 prior to the occurrence at AND gate 9 of the lagging edge of the initial pulse. Therefore, AND gate 9 is effective in passing the initial pulse to pulse counter 8, which then begins its count with this pulse.

While monostable multivibrator 51 is in its nonstable output condition, AND gate 54 is disabled. Monostable multivibrator 51 remains in its nonstable output condition for a preset time interval substantially equal in length to certain length time interval 45. Therefore, all pulses of the received pulse trains other than the initial pulse thereof, will not be passed by AND gate 54, which at this time is disabled, although they will be passed by AND gate 9, which is at this time enabled. At the end of the preset time interval, monostable multivibrator 51 switches back to its stable output condition, thereby disabling AND gate 9 and reenabling AND gate 54. The readout of pulse counter 8 may be made to occur only in response to a pulse on conductor 60 produced by monostable multivibrator 51 in response to its being switched back from its nonstable condition to its stable condition.

The reason that the counting means need not be synchronized with the pulse train generator is this: the pulse train generator generates a continuous stream of pulses having an average number of pulses in the certain length time interval that is unique for each character. Counting the number of pulses that occur in a time interval substantially equal in length to that certain length interval will yield a pulse count that is unique to only that pulse train signal manifesting the particular pulse count which is then being received. Since at the transmitter the pulse train generator generates a continuous pulse stream for as long as the switching means are in a closed switch condition, which may be substantially longer than time interval 45, then by randomly selecting the counting time interval substantially equal in length to that certain length time interval 45 at any time space such that the entire length of the counting time interval falls within the time limits of that particular character-manifesting pulse stream, there will result a pulse count signal unique to that particular pulse stream, which manifests the character then being transmitted.

It should be particularly noted that the disclosed embodiments of the invention are meant primarily for the purpose of illustration. It is contemplated that this invention will, in practical configurations, incorporate systems utilizing means which will generate and count pulses in character-manifesting pulse trains having a plurality of the aforesaid certain length time intervals generated for each character to be then transmitted and in which redundancy may be utilized to reduce transmission error. These systems necessarily would require more complex logic arrangements than those shown herein. However, these more complex logic arrangements, which are clearly within the skill of those skilled in the art, are not part of the present invention.

I claim:

1. A digital data transmission system for transmitting character-manifesting signals from a transmitting station to a receiving station, said system comprising:

a pulse train generator located at said transmitting station for selectively generating any one of a plurality of character-manifesting pulse train signals, said pulse train generator including, a pulse source producing a plurality of pulses occurring in serial order in a certain length time interval, a plurality of separate switching means each having respective open and closed switch conditions and first and second terminals, preprogrammed means having an input coupled to said source of pulses and having a plurality of outputs each of which is individually coupled to the first terminal of a different one of said switching means for distributing successive ones of said plurality of pulses among said switching means in accordance with the program of said preprogrammed means, and pulse combining means having a plurality of separate inputs each individually coupled to the second terminal of a different one of said switching means, and having a single output at which appears said pulse train signal, whereby said pulse train signal consists of that number of pulses occurring during said time interval equal to the sum of pulses distributed to said first terminals of only those switching means which are in their closed switch condition during the length of said time interval, character selection control means located at said transmitting station and coupled to said pulse train generator for controlling the selection of that one of said plurality of pulse train signals which is generated for said certain length time interval in accordance with the particular one of a plurality of characters which is then to be transmitted, transmission means for transmitting said selected pulse train signal from said transmitting station to said receiving station, and counting means located at said receiving station and operative over a receiving time interval substantially equal in length to said certain length time interval, said counting means being responsive to the receipt of said selected pulse train signal at said receiving station being applied as an input thereto for producing an output signal therefrom manifesting the number of pulses received during said received time interval, whereby the transmitted character is uniquely defined by said output signal.

2. The invention according to claim 1, wherein said plurality of outputs of said preprogrammed means are arranged in a predetermined order and said preprogrammed means comprises:

means for distributing pulses from said source of pulses among said plurality of outputs in accordance with the formula:

$$P_s = {}^{n11} + (m-1)2^n$$

where:

$P_s$= the ordinal position of a pulse in said source of serial order pulses in said certain length time interval, $n$=the ordinal position of the particular output of said preprogrammed means, and $m$=the ordinal position of occurrence of a pulse on any one of said outputs of said preprogrammed means during said certain length time interval.

3. The invention according to claim 1, wherein said source of pulses comprises a frequency standard clock generator whereby said plurality of pulses occur at a fixed repetition rate.

4. The according to claim 1 wherein said character selection control means comprises a manually operated keyboard establishing which switches are in their closed switch condition during the length of said time interval in accordance with the operation of said keyboard.

UNITED STATES PATENT OFFICE
CERTIFICATE OF CORRECTION

Patent No. 3,585,596 Dated June 15, 1971

Inventor(s) Murray Rosenblatt

It is certified that error appears in the above-identified patent and that said Letters Patent are hereby corrected as shown below:

Col. 2, line 53, "$P_s=^{n11}+(m-1)2^n$" should be -- $P_s=2^{n-1}+(m-1)2^n$ --.

Col. 3, line 33, "277" should be -- 27 --; line 73, "0" should be -- # --.

Col. 4, line 40, "is" should be -- in --.

Col. 6, line 39, "$P_s=^{n11}+(m-1)2^n$" should be -- $P_s=2^{n-1}+(m-1)2^n$ --; line 54, after "keyboard" insert -- for --.

Signed and sealed this 4th day of January 1972.

(SEAL)
Attest:

EDWARD M. FLETCHER, JR.
Attesting Officer

ROBERT GOTTSCHALK
Acting Commissioner of Patents

FORM PO-1050 (10-69)

USCOMM-DC 60376-P69
☆ U.S. GOVERNMENT PRINTING OFFICE : 1969 O—366-334